3,459,814
HYDROGENATION OF HYDROXY-CONTAINING DIENE POLYMERS
Stephen M. Kovach, Highland, Ind., and Robert A. Sanford and David W. Young, Homewood, Ill., assignors to Sinclair Research, Inc., New York, N.Y., a corporation of Delaware
No Drawing. Filed Apr. 17, 1967, Ser. No. 631,179
Int. Cl. C07c 29/04, 29/00
U.S. Cl. 260—635    9 Claims

ABSTRACT OF THE DISCLOSURE

Hydroxy-containing diene polymer (e.g. hydrogen peroxide-polymerized polybutadiene) is hydrogenated using, as a catalyst, platinum supported on a large pore alumina, i.e., an alumina having at least 0.22 cc./g. of pore volume in pores above about 500 A. in size; preferably the polymer, which may have a molecular weight af about 400 to 25,000, is in solution in an inert solvent such as a hydrocarbon of about 5 to 10 carbon atoms, e.g., n-heptane.

---

The present invention is directed to a method of hydrogenating hydroxyl-containing diene polymers. More particularly, the invention relates to a hydrogenation process employing an improved platinum-on-alumina catalyst whereby higher hydrogenation rates of the hydroxylated diene polymers are obtained. Specifically, the invention relates to a hydrogenation method employing a catalyst comprising platinum supported on a large pore alumina.

It is often desirable to alter chemical and/or physical properties of diene polymers such as polybutadiene oils by subjecting them to partial or near quantitative hydrogenation. The resulting polymers may exhibit such improved properties as increased solubility, higher viscosity indexes, reduced ethylenic activity, etc. The hydrogenation method commonly employed involves contacting the polymers with molecular hydrogen in the presence of a metallic hydrogenation catalyst, usually at elevated temperatures and pressures. Numerous catalysts have been disclosed in the art as being suitable for similar hydrogenation reactions. Those most commonly employed are catalysts such as nickel, reduced nickel, platinum, various metal sulfides, etc., either alone or supported on a suitable carrier such as charcoal, silica gel, kieselguhr, and the like. While the previously employed catalysts have been effective, at least to some extent, for hydrogenating the residual unsaturation of the diene polymer, the rates at which the hydrogenation has been effected have frequently left much to be desired. For reasons of economy and expediency it is often desired to employ a catalyst which, when used to reduce the residual unsaturation of a diene polymer via hydrogenation thereof, will proceed at a far more rapid rate toward saturation of the polymer than has been realized by prior art methods. Of the hydrogenation catalysts previously employed, that which has been known to exhibit perhaps the highest rate of hydrogenation for diene polymers is nickel supported on a charcoal, kieselguhr, or alumina carrier. While nickel catalysts may have provided an essentially satisfactory rate and extent of hydrogenation in the case of the non-hydroxylated and highly branched diene polymers, as for example those resulting from sodium-catalyzed polymerization, for some reason their catalytic effect on the hydrogenation of hydroxyl-containing, substantially linear, diene polymers has been insufficient where rapid hydrogenation is desired. There exists a need, then, for a method of hydrogenating, or reducing the unsaturation, of hydroxyl-containing, substantially linear, diene polymers at hydrogenation rates greater than that afforded by prior art methods.

It has now been found that by the use of a platinum catalyst supported on a large pore alumina, the resulting rate and extent of hydrogenation are substantially greater than that from the use of the nickel-containing catalysts advocated by the prior art. The catalyst of the present invention consists essentially of platinum supported on an alumina having a large amount of pore volume in pores above about 500 angstrom units in size. The platinum will usually be provided in amounts of about 0.1 to 2 wt. percent of the support, preferably about 0.2 to 1.5 wt. percent, calculated as the free metal. The alumina can be any suitable hydrate or an activated or calcined hydrogel. Hydrates, such as the monohydrate, boehmite, or another hydrous alumina which appears to be amorphous and, preferably, which contains a major portion or consists essentially of boehmite, say at least about 40%, may be employed. Calcination converts these hydrates to an activated or gamma family type alumina. The alumina hydrate can be prepared by conventional methods; for example, an aqueous solution of aluminum chloride, or other acidic aluminum salt can be reacted with aqueous ammonium hydroxide to precipitate an essentially boehmite or amorphous alumina hydrate. This material can then be washed to remove chloride and ammonium ions.

At the time of addition of the platinum the alumina can be activated, or a dried or undried alumina hydrate, or alumina hydrogel in gelatinous form dried sufficiently to afford discrete particles; in any event, finely divided particles, e.g., passing about 100 or even 200 mesh (Tyler) for the most part, such as spray dried microspheres, are preferred. Such alumina supports are usually characterized by a large surface area ranging from about 75 to 400, or more, square meters per gram, preferably between about 100 and 300 square meters per gram, as determined by the BET method. The alumina will have a relatively large content of macropore volume, i.e., pores above about 500 angstrom units in size. Thus, the alumina will have at least 0.22, preferably at least 0.25, cubic centimeter, per gram of pore volume in pores of this size. The average radius of the micropores will often be about 10 to 50 A.

Whereas a typical alumina support made from boehmite alumina may have essentially no pores greater than about 50 angstrom units in size, supports made from precursor alumina mixtures containing high percentages of the crystalline trihydrates have, in addition to such micropore structure, considerable pore volume in pores greater than 500 angstrom units in size and are ideally suited for use in the method of the present invention.

The impregnation of the large pore alumina support with platinum may be carried out by known methods. The alumina either with or without previous evacuation, may, for example, be soaked in either a dilute or concentrated aqueous solution of a water-soluble platinum compound. As suitable compounds, there may be mentioned: chloroplatinic acid, potassium platinum chloride, potassium platinonitrite, ammonium platinonitrite, ammonium platinum chloride, trimethylbenzyl ammonium platinum chloride, bromoplatinic acid, iodoplatinic acid, dinitrito diammino platinum, tetrammino platino chloride, dichloro diammino platinum, and the like. Sufficient platinum compound will be impregnated on the alumina support to provide catalytically-active amounts of platinum in the finished catalyst. After impregnation of the alumina with the platinum compound the composite can be dehydrated or dried by any suitable procedure to remove free water. In general, drying or dehydration is conducted at temperatures ranging from about 215 to 250° F.; however, if vacuum drying is employed—an often preferred technique—temperatures as low as about 100–140° F., preferably about 120° F., may be employed. Either before or after the dehydration, the catalyst can, if desired, be formed into macrosized particles by tabletting or extruding. Generally, these macrosized particles are about $\frac{1}{32}$ to $\frac{1}{2}$ inch in diameter and about $\frac{1}{16}$ to 1 inch, or more, in length. After drying, the composite may be calcined to an active or catalytic state, e.g. at temperatures of about 750 to 1200° F. or more, preferably about 800 to 1000° F. Advantageously, this is done by contact with a flowing gas stream such as air, nitrogen, etc. If desired, the catalyst may also be reduced at the same time by supplying a stream of hydrogen.

The diene polymer which, by use of the platinum-alumina catalyst of this invention, can be hydrogenated at excellent hydrogenation rates is one having, on the average, at least about 1.8 predominantly primary, allylic, terminal, i.e., attached to a terminal carbon atom, hydroxyl groups per polymer molecule. The diene polymer prior to hydrogenation may have a viscosity at 30° C. of about 5 to 20,000 poises, preferably about 15 to 5,000 poises. Thus, the polymer to be hydrogenated is essentially liquid, including a semi-solid flowable under moderate pressure at ambient temperatures or at temperatures in the range of −100° F. to 400° F. These hydroxyl-containing diene polymers have average molecular weights in the range of about 400 to 25,000, often about 900 to 10,000, as determined by cryoscopic, ebullioscopic or osmometric methods.

The hydroxyl-terminated diene polymers to be hydrogenated preferably have a hydroxyl-functionality greater than 2, e.g., in the range of about 2.1 to 2.6, although the functionality may exceed the range cited, e.g., it may range up to 3 or more. The polymers will often have primary hydroxyl groups in terminal allylic positions on the main, or longest, hydrocarbon chain of the molecule. By "allylic" configuration is meant the alpha-allylic grouping of allylic alcohol; that is, the hydroxyls of the polymer are attached to carbon atoms adjacent the double-bond carbon atoms. The polymer product of the hydrogenation treatment, while reduced in olefinic content, may retain a substantial amount, e.g., often at least about 40%, of its hydroxyl functionality, thereby enabling the hydrogenated product to enter into subsequent chemical reactions with, for instance, isocyanates, carboxylic acids, phosgene, etc.

The dienes which are employed to make the hydroxyl-containing polymers are unsubstituted, 2-substituted or 2,3-disubstituted, 1,3-dienes of up to about 12 carbon atoms. The diene preferably has up to 6 carbon atoms and the substituents in the 2- and/or 3-position may be hydrogen, alkyl, generally lower alkyl, e.g., of 1–4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, etc.

Mono-olefinically unsaturated monomers may also be incorporated into the diene polymer. Generally, they will be present only in minor amounts, say up to about 40 percent by weight of the total monomers. Usable copolymerizable monomers include alpha-monoolefinic materials of about 2 to 12, preferably 3 to 10, carbon atoms such as styrene, vinyl toluene, methyl methacrylate, acrylic esters, acrylonitrile, vinyl chloride, etc.

The number and location of the hydroxyl groups and the molecular weight of the diene polymer are, for the most part, a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place in a mutual solvent system, that is, one which dissolves both the diene monomer and the hydrogen peroxide. Suitable solvents are isopropanol, acetone, methanol, sec-butanol, n-butanol, n-propanol and like alcohols having 2 to about 12 carbon atoms. The $H_2O_2$-solvent system is found to supply hydroxyl groups and the catalytic and solvent effects needed to produce diene polymers of the desired characteristics. In such a polymerization system, the alcohol serves as a solvent for the peroxide and as a solvent or diluent for the diene monomer and is used in an amount suitable to promote adequately rapid, but controllable, polymerization of the diene monomer in the solution to form the diene polymer. The alcohol will be free of any group which would interfere with the production of polymer. Saturated alcohols are preferred and often those having about the same carbon atom content as the diene monomer will be found most useful. Thus, propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 to 10 weight percent of the reaction mixture to assure an addition polymer product having more than about two hydroxyl groups per molecule. Unlike those diene polymers produced, for example, by sodium catalysis and subsequently hydroxylated by reaction with hydrogen peroxide so as to effect random hydroxylation, the polymers of the present invention are selectively hydroxylated at terminal carbon positions. The sodium-catalyzed diene polymers further differ from those hydrogenated by the present method in that their manner of preparation necessarily results in a highly branched polymer, whereas the present polymers are predominantly linear.

To cite an example of the preferred chemical structure of the diene polymer of this invention, a simplified structural formula of polybutadiene may be given as:

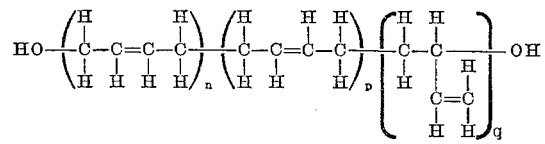

in which $n$ plus $p$ is greater than $q$, that is, the in-chain unsaturation accounts for more than 50% of the unsaturation. One or more of the hydrogen atoms appearing in the above formula will usually be replaced by hydroxyl in at least some of the molecules. This formula should not be understood as implying that the polymers are necessarily in blocks, but the cis-1,4, trans-1,4 and vinyl (1,2) unsaturation are usually distributed throughout the polymer molecule. The letter $n$ may be a number sufficient to give a cis-1,4 unsaturation content of about 10–30 percent; $p$ may be a number sufficient to give a trans-1,4 unsaturation content to the polymer in the range of about 40–70 percent; while $q$ may be sufficient to give a pendant 1,2-vinyl unsaturation of about 10–35 percent. Often the polymer will contain largely trans-1,4 units, with about 15–25 percent 1,2-units. Some branching may also occur in the above polymers, especially those prepared at higher temperatures, but the polymers will have a predominantly linear configuration. It should be emphasized, however, that the hydrogenation method of the present invention is not necessarily limited in application to hydroxyl-containing diene polymers having the predominating trans-1,4 structure, but contemplates the use of polymers having high cis-1,4 forms as well.

Hydrogenation of the hydroxyl-containing diene polymer with the platinum-on-large-pore-alumina catalyst of the present invention can often be conducted at temperatures of about 100 to 600° F., preferably about 300° to 500° F. Preferably, the hydrogenation will be carried out in the liquid phase, employing a suitable solvent such as an inert hydrocarbon solvent of about 5 to 10 carbon atoms. Illustrative of suitable solvents are n-heptane, "Decalin," naphthalene, etc. Oxygenated solvents such as tetrahydrofuran, ethyl ether, and the like, are particularly to be avoided however, as they exhibit instability when used in hydrogenation reactions in conjunction with a platinum-containing catalyst. Other suitable conditions include a pressure in the range of about 100, to 10,000 p.s.i.g. (pounds per square inch gauge), preferably about 100 to 2000 p.s.i.g.; a molar ratio of hydrogen to polymer of about 1 to 20:1, preferably 1 to 10:1, and a weight ratio of polymer to solvent of about 0.1 to 10:1, preferably about 0.1 to 2:1.

The hydrogenation reaction can be carried out batchwise, continuously, or in a semi-continuous manner. In batch operations the amount of platinum-alumina catalyst employed will often be from about 1 to 5%, based on the weight of polymer. In continuous hydrogenation, a liquid hourly space velocity, i.e., the volume of feed per volume of catalyst per hour, may range from about 0.01 to 10, preferably about 0.1 to 1, LHSV.

The following example illustrates one method of preparing a suitable alumina support for the platinum catalyst used in the method of the present invention.

EXAMPLE I

An alumina hydrogel is prepared as follows:

In a tank containing 5700 gallons of water at 85° F., are dissolved 300 lbs. of soda ash. When the soda ash has been dissolved, 180 gallons of a 39% concentration aqueous sodium aluminate solution are pumped into the tank in about a 15-minute period. The contents of the tank are at about 84° F. Six-hundred gallons of aqueous aluminum sulfate of 7.8% concentration, calculated as $Al_2O_3$, is added to the admixture over an 80-minute period with water of dilution in conjunction with, and in addition thereto, diluting the reaction mass at a rate of 25 gallons per minute.

The pH of the resulting aqueous reaction mass is adjusted to 8.0 with about 75 gallons of 39% concentration aqueous sodium aluminate solution which, while being added, is also diluted continuously with water at a rate of 35 gallons per minute over a 7½ minute addition period. The contents of the tank are heated to about 100° F. and pumped to storage.

The precipitated, hydrated alumina is thereafter filtered on a large gel filter. The filtered product is partially purified by a one-cycle water-wash on the filter on which it is collected. This filter is a string vacuum type drum filter with a built-in water spray nozzle directed toward the filter drum. Material on the drum is contacted with water as the drum rotates past the nozzle. After washing, the wet alumina hydrogel is stripped from the drum. Dried samples of this hydrogel analyzed about 50% boehmite having a crystallite size of about 35° A., and about 50% amorphous hydrous alumina, as determined by X-ray diffraction.

The following example illustrates the preparation of a platinum-alumina catalyst suitable for use in the process of the present invention.

EXAMPLE II

A calcined hydrous alumina prepared as in Example I analyzed as follows:

Surface area _____ m.²/g__ 246
Total pore volume _____ cc./g__ 0.83
Volume in macropores (greater than 500 angstroms radius) _____ cc./g__ 0.26
Average micropore radius _____ angstroms__ 47

$$\left(\text{Calculated as: } \frac{2 \times \text{micropore volume} \times 10^4}{\text{surface area}}\right)$$

200 grams of the calcined alumina was placed under about 28′ Hg vacuum and impregnated with 210 ml. of an aqueous chloroplatinic acid solution containing 10.4 mg. of platinum (calculated as the free metal) per ml. of solution so as to just saturate the alumina. The saturated alumina was placed under vacuum for one hour with frequent agitation to equilibrate, after which it was dried for about three hours using a rotary vacuum drier and maintaining a temperature of about 120° F. with a heat lamp. The catalyst was then dried in a forced-air oven for 16 hours at 230° F., and finally calcined in flowing dry air for three hours at 900° F. Analysis of the finished catalyst on an ignited weight basis indicated a volatile content of 4.20 weight percent of 1100° F. and 1.13 weight percent of platinum, calculated as the free metal.

The following examples (III–VIII) illustrates the advantage of the hydrogenation method of the present invention, viz, employing a platinum-on-large-pore-alumina catalyst, as compared to the use of a nickel-alumina catalyst or a platinum-on-small-pore-alumina catalyst. In each of these examples, hydrogenation was performed in a stainless steel Universal 1″ ID reactor heated by a radiant heat furnace. The temperature of the reaction was controlled by Fenwall thermostats and the temperature of the catalyst bed was measured by means of chromel-alumel thermocouples located throughout the bed. The polymer feed was charged to the reactor by means of a Lapp pump. Hydrogen was metered to the reactor through a Fisher-Porter armored rotameter. The liquid product was separated from the effluent gas in a Jerguson liquid-level gauge and then released to atmospheric pressure at room temperature. The effluent gas was measured by means of an American wet test meter. The products were distilled to strip the solvent from the polymer. The bottoms from distillation were stripped on a film evaporator and analyzed. Degree of hydrogenation was determined by measurement of hydrogen in and out of the reactor and in some cases by Nuclear Magnetic Resonance.

EXAMPLES III–V

Examples III through V were performed with a polybutadiene having a viscosity at 30° C. of 200 poises, a hydroxyl content of 0.80 meq./g., a hydroxyl number of 45 mg. KOH/g. of polymer, an average molecular weight of 3000 to 3500, about 2.6 terminal, allylic hydroxyl groups (predominantly primary) per polymer molecule and an iodine number of 395. The polymer is made by polymerizing 100 parts of butadiene-1,3 in the presence of 35 parts of isopropanol and 6 parts of hydrogen peroxide for 2½ hours at 130° C. The conditions and results of hydrogenation are given in the table to follow.

EXAMPLES VI–VIII

These runs were also performed using a polybutadiene, but one having a viscosity at 30° C. of 50 poises, a hydroxyl content of 0.95 meq./g., a hydroxyl number of 53 mg. KOH/g. of polymer, an average molecular weight of 2200 to 2500, about 2.1 to 2.2 terminal, allylic, hydroxyl groups (predominantly primary) per polymer molecule and an iodine number of 398. It is prepared by polymerizing 100 parts of butadiene-1,3 in the presence of 70 parts of isopropanol and 10 parts of hydrogen peroxide in an aluminum clad autoclave at 118° C. for 2 hours.

Conditions and results of hydrogenation are reported in the following table.

ducting the hydrogenation in the presence of a catalyst consisting essentially of catalytic amounts of platinum

TABLE

| | Example | | | | | |
|---|---|---|---|---|---|---|
| | III | IV | V | VI | VII | VIII |
| Catalyst | 60% Ni/Kieselguhr | 0.6% Pt/Al$_2$O$_3$ (1) | 1.1% Pt/Al$_2$O$_3$ (2) | 60% Ni/Kieselguhr | 0.6% Pt/Al$_2$O$_3$ (1) | 1.1% Pt/Al$_2$O$_3$ (2) |
| Conditions: | | | | | | |
| Temp., °F | 350 | 360 | 350 | 360 | 360 | 360 |
| Press., p.s.i.g | 1,400 | 1,400 | 1,400 | 1,00 | 1,400 | 1,400 |
| LHSV | 0.1 | 0.1 | 0.1 | 0.1 | 0.1 | 0.1 |
| H$_2$/polymer, molar ratio | 7/1 | 7/1 | 7/1 | 7/1 | 7/1 | 7/1 |
| Solvent/polymer, weight ratio | 9/1 | 9/1 | 9/1 | 7/1 | 9/1 | 9/1 |
| Olefinic hydrogen (wt. percent, based on total H in polymer): | | | | | | |
| Before | 35.2 | 35.2 | 36.1 | 36.1 | 36.1 | 36.1 |
| After | 21.5 | 26.7 | 2.7 | 15.0 | 15.4 | 2.7 |
| Percent hydrogenation | 40 | 24 | 92 | 59 | 57 | 93 |

*Notes to Table:*
(1) Platinum impregnated on small-pore alumina having following characteristics:
 Surface area: 500 square meters per gram.
 Total pore volume: 0.55 cc./g.
 Volume in macropores: 0.19 cc./g (greater than 500 angstroms radius).
 Average micropore radius: 14 angstroms
(2) Catalyst of Example II, i.e., platinum on large-pore alumina.

The results as recorded in the above table indicate that the nickel-kieselguhr catalyst (Examples III and VI) provided intermediate conversions of the hydroxyl-terminated polybutadiene to yield polymers having about 40 to 60% saturation. Results from using a platinum on small-pore alumina were no better, Example IV exhibiting only about 24% hydrogenation of the polymer and Example VII giving about 57% hydrogenated polymer. Examples V and VII, on the other hand, where the platinum-impregnated large-pore alumina catalyst of the present invention was employed, resulted in greater than 90% hydrogenation of the polymer.

The extent to which the hydroxyl-terminated diene polymer is hydrogenated determines the nature and degree of change in the physical and chemical properties of the polymer. Thus, for example, hydrogenation of 25% or more of the unsaturation, as described in co-pending application S.N. 510,397, filed Nov. 29, 1965, will result in a diene polymer having increased effectiveness as a pour depressant, e.g., in mineral oil compositions; while a reduction in residual unsaturation by only 1%, as described in co-pending application S.N. 510,387, also filed Nov. 29, 1965, will improve the color, odor and stability of the diene polymer; and a greater than 40% reduction in unsaturation, as described in co-pending application S.N. 571,976, filed August 12, 1966, will often yield a solid polymer having physical characteristics approaching that of hydrocarbon wax and useful, for example, in coating and waterproofing compositions.

It is claimed:

1. In a process of hydrogenating a predominantly linear, hydroxyl-containing diene polymer, having an average molecular weight in the range of about 400 to 25,000, by contacting the polymer in inert hydrocarbon solvent with molecular hydrogen at 100° F. to 600° F. and 100 to 10,000 p.s.i.g., the improvement which comprises conducting the hydrogenation in the presence of a catalyst consisting essentially of catalytic amounts of platinum supported on an alumina having at least 0.22 cc./g. of pore volume in pores above about 500 A. in size.

2. The process of claim 1 wherein the platinum is present in amounts of about 0.2 to 1.5%, by weight of the alumina.

3. The process of claim 1 wherein the diene has about 4 to 12 carbon atoms.

4. The process of claim 3 wherein the diene is 1,3-butadiene.

5. The process of claim 4 wherein the hydrogenation is conducted at a temperature of about 300 to 500° F., a pressure of about 100 to 2000 p.s.i.g., and a molar ratio of hydrogen to polymer of about 1 to 10:1.

6. The process of claim 5 wherein the polymer is dissolved in an inert hydrocarbon solvent of about 5 to 10 carbon atoms.

7. The process of claim 6 wherein the weight ratio of polymer to solvent is about 0.1 to 2:1.

8. The process of claim 7 wherein the hydrogenating is conducted in a continuous manner.

9. The process of claim 8 wherein a liquid hourly space velocity of about 0.1 to 1 is employed.

References Cited

UNITED STATES PATENTS

| 2,850,539 | 9/1958 | Schott et al. |
| 2,916,356 | 12/1959 | Keith et al. |
| 3,108,142 | 10/1963 | Reppe et al. |
| 3,376,106 | 4/1968 | Gring et al. |

BERNARD HELFIN, Primary Examiner

J. E. EVANS, Assistant Examiner

U.S. Cl. X.R.

252—52, 55, 466; 260—80, 82, 83, 85, 88, 92, 93, 94, 465, 491, 618, 633, 642